United States Patent
Ishibashi

(10) Patent No.: US 10,965,866 B2
(45) Date of Patent: Mar. 30, 2021

(54) IMAGE GENERATION SYSTEM, IMAGE DISPLAY SYSTEM, IMAGE GENERATION METHOD, AND MOVING VEHICLE

(71) Applicant: PANASONIC INTELLECTUAL PROPERTY MANAGEMENT CO., LTD., Osaka (JP)

(72) Inventor: Yudai Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 12 days.

(21) Appl. No.: 16/354,925

(22) Filed: Mar. 15, 2019

(65) Prior Publication Data
US 2019/0297257 A1    Sep. 26, 2019

(30) Foreign Application Priority Data
Mar. 20, 2018    (JP) .............................. JP2018-053549

(51) Int. Cl.
*H04N 5/232* (2006.01)
*G06T 7/70* (2017.01)
*B60R 11/04* (2006.01)

(52) U.S. Cl.
CPC ......... *H04N 5/23229* (2013.01); *B60R 11/04* (2013.01); *G06T 7/70* (2017.01); *B60R 2300/105* (2013.01)

(58) Field of Classification Search
CPC .... H04N 5/23229; H04N 7/181; B60R 11/04; B60R 2300/105; B60R 2300/70; B60R 1/00; G06T 7/70; G06K 9/6211; G06K 9/4671; G06K 9/00624
See application file for complete search history.

(56) References Cited

U.S. PATENT DOCUMENTS

| | | | |
|---|---|---|---|
| 8,219,878 B1 * | 7/2012 | Varnica | H03M 13/1142 714/758 |
| 8,625,680 B2 * | 1/2014 | Srinivasan | H04N 19/117 375/240.27 |
| 2008/0013787 A1 * | 1/2008 | Kobayashi | H04N 5/23219 382/103 |
| 2012/0105679 A1 | 5/2012 | Osuga et al. | |
| 2016/0224847 A1 * | 8/2016 | Fernandez | G08G 1/16 |

(Continued)

FOREIGN PATENT DOCUMENTS

| | | |
|---|---|---|
| JP | 2008-190868 | 8/2008 |
| JP | 2012-95075 | 5/2012 |

(Continued)

*Primary Examiner* — Hung H Lam
(74) *Attorney, Agent, or Firm* — Greenblum & Bernstein, P.L.C.

(57) ABSTRACT

An image generation system according to an embodiment includes an acquisition unit, a first processing unit, and a second processing unit. The acquisition unit acquires first image data. The first processing unit generates second image data by subjecting the first image data, acquired by the acquisition unit, to a predetermined type of image processing. The second processing unit performs recognition processing on the second image data. The first processing unit and the second processing unit perform their respective processing in synchronization with each other without depending on an instruction from a processor.

19 Claims, 10 Drawing Sheets

(56) References Cited

U.S. PATENT DOCUMENTS

2017/0111661 A1* 4/2017 Boyce .................... H04N 19/85
2019/0102892 A1* 4/2019 Kitani .................... B60R 1/002
2019/0174060 A1* 6/2019 Oba ...................... H04N 5/3572

FOREIGN PATENT DOCUMENTS

| JP | 2017-085297 | 5/2017 |
| JP | 2018-022974 | 2/2018 |

* cited by examiner

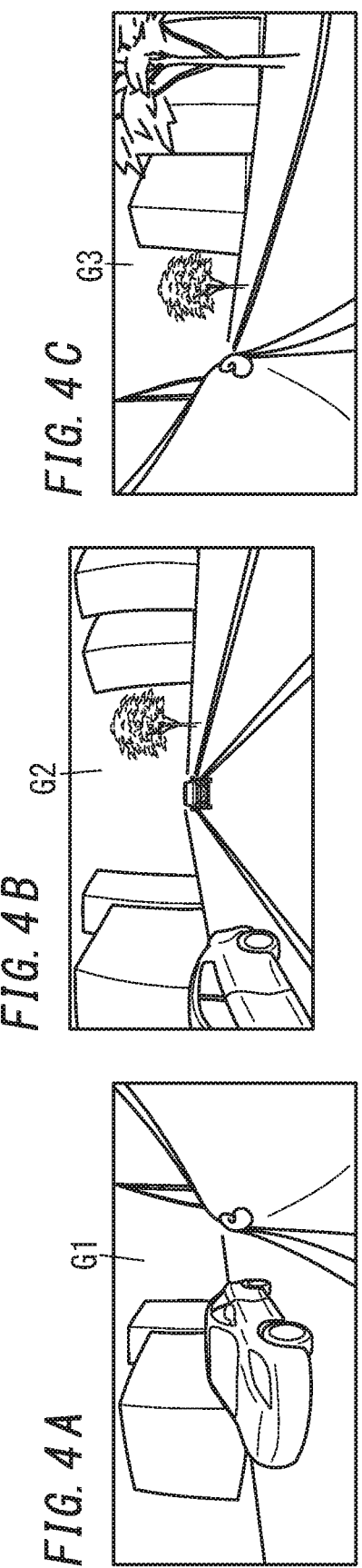
FIG. 4A
FIG. 4B
FIG. 4C
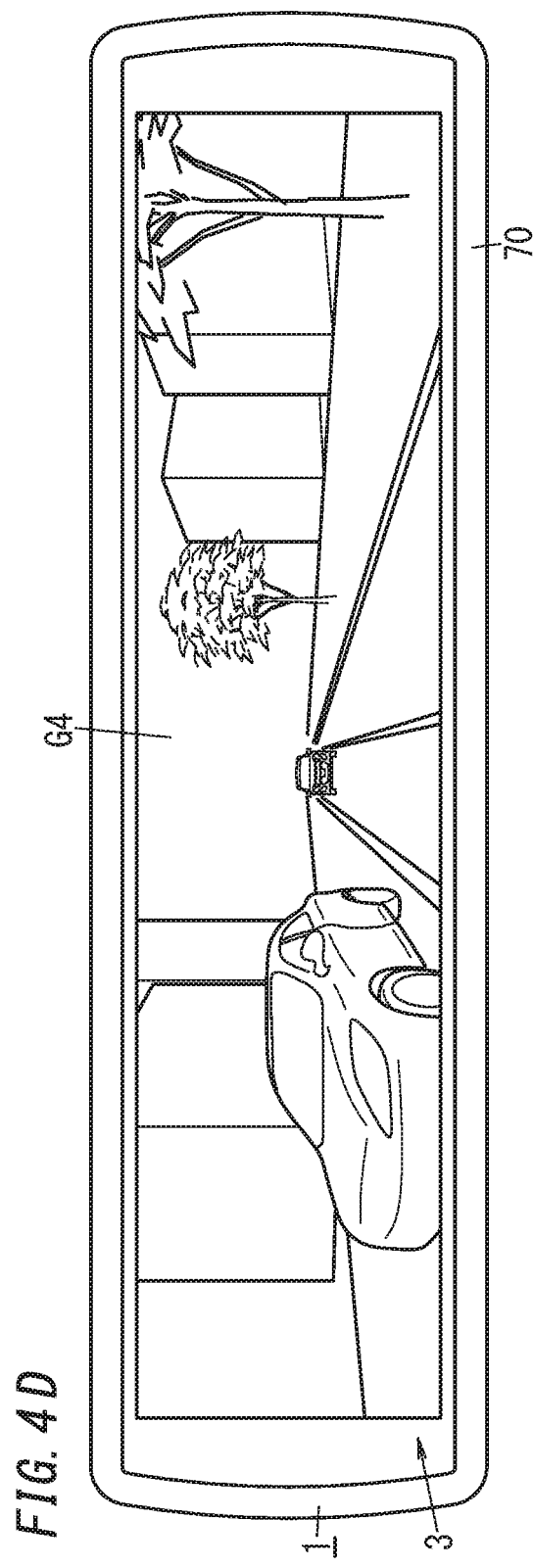
FIG. 4D

ＵＳ 10,965,866 B2

IMAGE GENERATION SYSTEM, IMAGE DISPLAY SYSTEM, IMAGE GENERATION METHOD, AND MOVING VEHICLE

CROSS-REFERENCE TO RELATED APPLICATION

This application claims the benefit of foreign priority to Japanese Patent Application No. 2018-53549 filed on Mar. 20, 2018, which is assigned to the assignee of the present application.

TECHNICAL FIELD

The present disclosure generally relates to an image generation system, an image display system, an image generation method, and a moving vehicle, and more particularly relates to an image generation system, an image display system, an image generation method, and a moving vehicle, all of which are configured or designed to generate image data by subjecting input image data to image processing.

BACKGROUND ART

An omnidirectional image display system has been known in the art as a system for generating an omnidirectional image (also called a "bird's-eye image") based on the image data captured by a plurality of cameras and displaying the image on a display device (see, for example, Japanese Unexamined Patent Application Publication No. 2012-95075 (hereinafter referred to as D1)).

This omnidirectional image display system includes a processor for generating the omnidirectional image based on the image data provided by the plurality of cameras and displaying the omnidirectional image on the display device.

The processor includes a plurality of image processing modules and a central processing unit (CPU). Each of the plurality of image processing modules subjects an image, supplied by an associated one of a plurality of cameras, to processing of correcting lens distortion caused by a fisheye lens, and writes the distortion-corrected image on a semiconductor memory. Each of the plurality of image processing modules includes a display list buffer to store a display list and performs the distortion correction in accordance with the display list stored in the display list buffer. When the plurality of image processing modules obtains image data for one frame, a TRAP instruction, included in the display list, is executed to generate an interruption to the CPU's processing. In response to the interruption, the CPU performs a predetermined type of interruption processing and reads the distortion-corrected image data from the semiconductor memory to generate an omnidirectional image based on the distortion-corrected image data and display the omnidirectional image on the display device.

The CPU performs a predetermined type of interruption processing in response to the interruption by the plurality of image processing modules. However, the interruption to the CPU's processing gives rise to a delay in its processing, thus causing a decline in its processing speed.

SUMMARY

The present disclosure provides an image generation system, an image display system, an image generation method, and a moving vehicle, all of which are configured or designed to curb the decline in processing speed.

An image generation system according to an aspect of the present disclosure includes an acquisition unit, a first processing unit, and a second processing unit. The acquisition unit acquires first image data. The first processing unit generates second image data by subjecting the first image data, acquired by the acquisition unit, to a predetermined type of image processing. The second processing unit performs recognition processing on the second image data. The first processing unit and the second processing unit perform their respective processing in synchronization with each other without depending on an instruction from a processor.

An image display system according to another aspect of the present disclosure includes the image generation system described above, and a display unit configured to display the image generated by the image generation system.

An image generation method according to still another aspect of the present disclosure includes: acquiring first image data; generating second image data by subjecting the first image data to a predetermined type of image processing; and performing recognition processing on the second image data. In this image generation method, the image processing and the recognition processing are performed in synchronization with each other without depending on an instruction from a processor.

A moving vehicle according to yet another aspect of the present disclosure includes the image display system described above, and a moving vehicle body configured to mount the image display system thereon.

BRIEF DESCRIPTION OF DRAWINGS

FIG. 4A depicts a camera image supplied to the image display system;

FIG. 4B depicts another camera image supplied to the image display system;

FIG. 4C depicts still another camera image supplied to the image display system;

FIG. 4D depicts a synthetic image displayed by the image display system;

DESCRIPTION OF EMBODIMENTS

Embodiments (1) Overview

Figure 1:
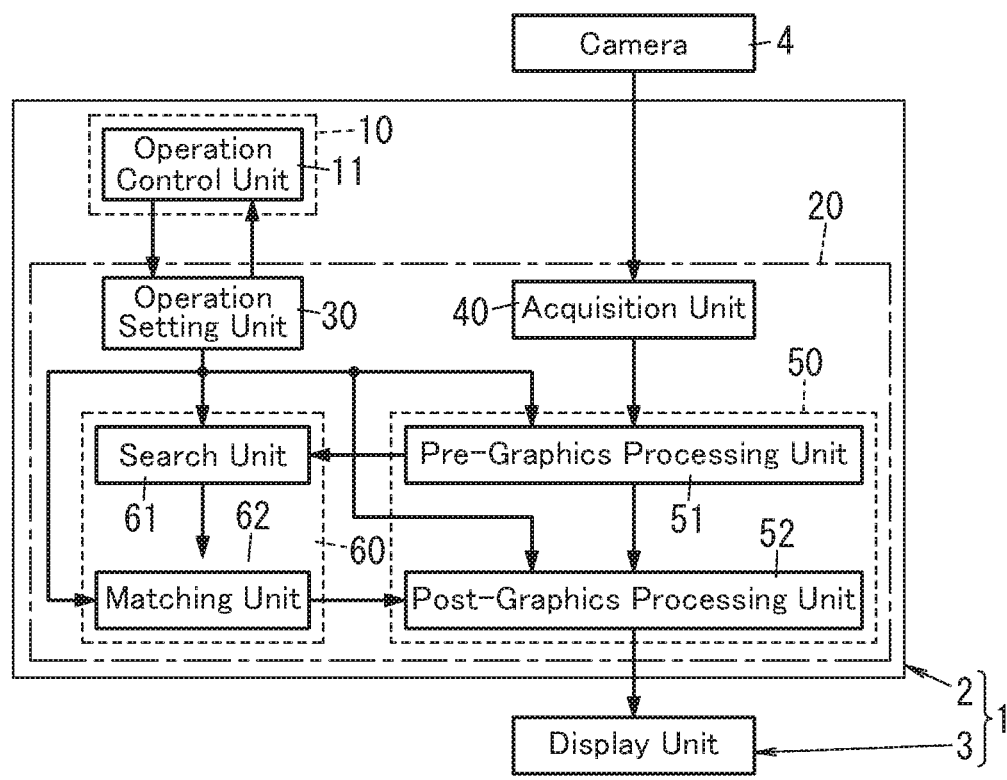
FIG. 1 is a block diagram of an image display system including an image generation system according to an exemplary embodiment of the present disclosure.

An overview of an image generation system 2 according to an exemplary embodiment will be described with reference to FIG. 1.

An image generation system 2 according to this exemplary embodiment generates second image data by subjecting first image data to a predetermined type of image processing, and then performs recognition processing on the second image data thus generated.

The image generation system 2 includes an acquisition unit 40, a first processing unit 50, and a second processing unit 60. The acquisition unit 40 acquires first image data. The first processing unit 50 generates second image data by subjecting the first image data, acquired by the acquisition unit 40, to a predetermined type of image processing. The second processing unit 60 performs recognition processing on the second image data. The first processing unit 50 and the second processing unit 60 perform their respective processing in synchronization with each other without depending on an instruction from a processor (software processing unit 10).

An image display system 1 according to this exemplary embodiment includes the image generation system 2, and a display unit 3 for displaying the image generated by the image generation system 2.

A moving vehicle 100 (see FIG. 2) according to this exemplary embodiment includes the image display system 1, and a body (moving vehicle body) 101 that mounts the image display system 1 thereon.

If the processor does not allow the second processing unit 60 to start performing the recognition processing until the processor receives a completion signal from the first processing unit 50 that has performed the image processing, then the processor has to wait for the completion signal to come from the first processing unit, thus possibly causing a decline in the processing speed of the processor. In contrast, in the image generation system 2 according to this embodiment, the first processing unit 50 and the second processing unit 60 perform their respective processing in synchronization with each other without depending on an instruction from a processor (e.g., a software processing unit 10 (to be described later)). This eliminates the need for the processor 10 to wait for a signal indicating the completion of the image processing to come from the first processing unit 50, thus curbing the decline in the processing speed of the processor.

In this embodiment, the acquisition unit 40 acquires, from a camera 4 such as a digital camcorder, first image data representing a plurality of image frames captured by the camera 4 that shoots video on a regular or irregular basis. The plurality of image frames represented by the first image data will be hereinafter referred to as a "first group of image frames." The camera 4 includes an image capture device such as a complementary metal oxide semiconductor (CMOS) image sensor or a charge coupled device (CCD) image sensor. The camera 4 outputs the first image data obtained by shooting video at regular or irregular intervals. In this embodiment, the acquisition unit 40 acquires the first image data from the camera 4. However, this is only an example and should not be construed as limiting. Alternatively, the acquisition unit 40 may also acquire first image data stored in an external storage device or accumulated in a database from the external storage device or the database. Examples of external storage devices include a hard disk drive (HDD), a solid state drive (SSD), and a flash memory. Optionally, the acquisition unit 40 may receive first image data transmitted as radio waves from a broadcasting station or first image data transmitted over a communications network.

Also, when the camera 4 includes a wide-angle lens, for example, the "predetermined type of image processing" refers herein to correction processing of correcting distortions of an image represented by the first image data obtained based on the video shot by the camera 4. However, this is only an example and should not be construed as limiting. The predetermined type of the image processing may also be processing of correcting at least one of the distortion, deformation, brightness, contrast, color tone, or size of the image represented by the first image data.

Furthermore, the recognition processing performed by the second processing unit 60 on the second image data refers herein to the processing of searching the second image data for a feature quantity and recognizing an object (e.g., a moving object such as a human or a car, or a still object such as a building or a tree) in the second image data based on the feature quantity found by searching. As used herein, the "feature quantity" may be a numerical representation of some feature (such as density, illuminance, or color) of each pixel or a numerical representation of some feature (such as density, illuminance, or color) of a "region," which is a set of a plurality of adjacent pixels. The second processing unit 60 may also detect a feature point based on the feature quantity found by searching the second image data. As used herein, the "feature point" refers to a point representing a feature on the image, and does not have to be a single pixel but may also be a set (region) of adjacent pixels. The second processing unit 60 may recognize an object in a given image based on the feature quantity found by searching the second image data. Alternatively, the second processing unit 60 may recognize the same object commonly captured in a plurality of image frames based on the feature quantities found by searching the plurality of image frames represented by the second image data (which will be hereinafter referred to as a "second group of image frames").

(2) Details

An image generation system 2 according to this embodiment and an image display system 1 including the image generation system 2 will be described with reference to FIGS. 1-3.

Figure 2:
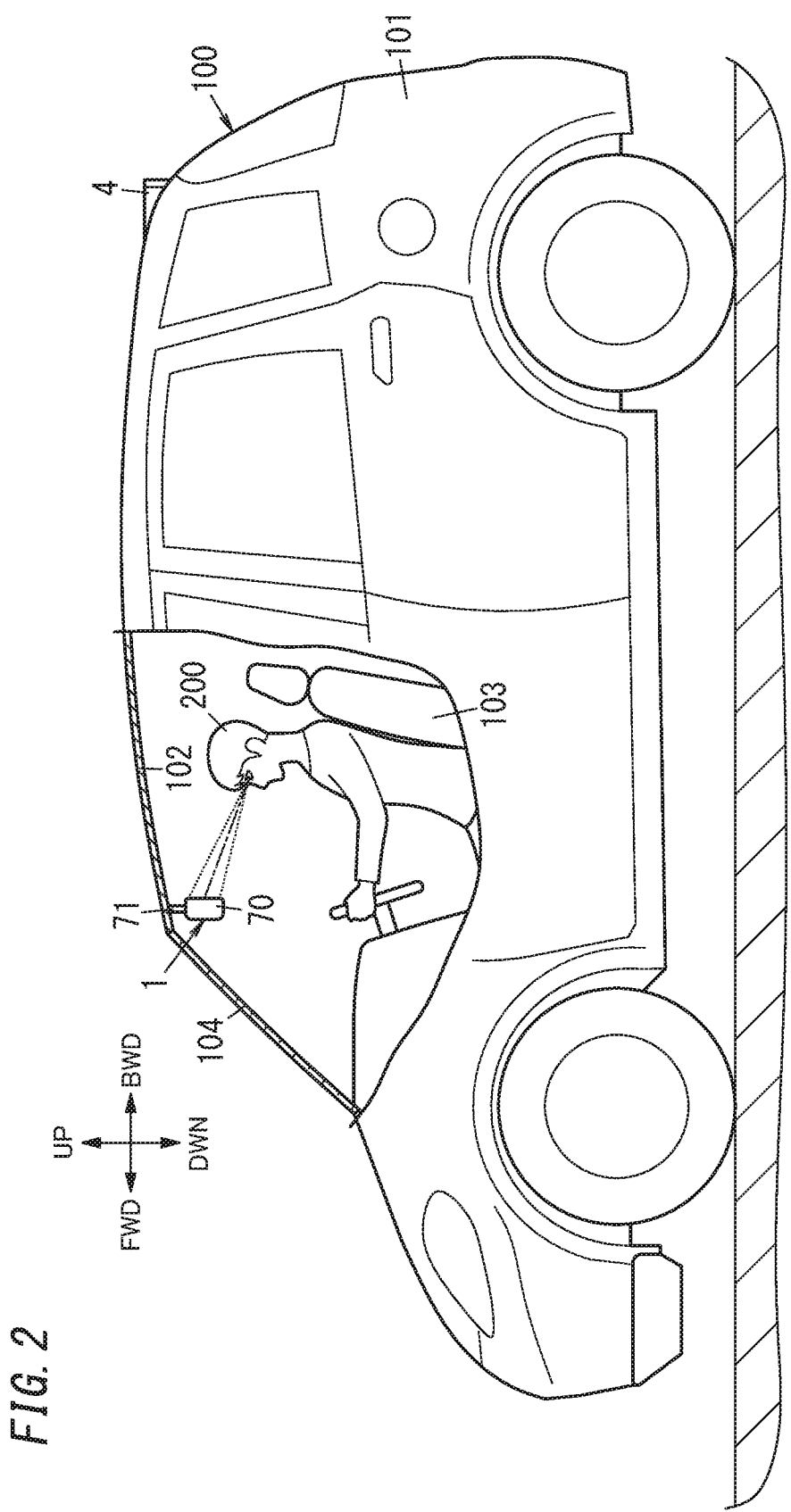
FIG. 2 is a schematic representation depicting a moving vehicle including the image display system.

The image display system 1 of this embodiment is applicable to an automobile (moving vehicle) 100 as shown in FIG. 2. The image display system 1 of this embodiment is implemented as an electronic mirror system provided for the body (moving vehicle body) 101 of the automobile 100 to display the video, shot by the camera 4 to present a view (such as a rear view) of the outside of the body 101, on a display unit 3 (see FIGS. 2 and 3) arranged inside of the body 101 (i.e., inside of the vehicle cabin). In the following description, the upward, downward, forward, and backward directions are herein defined just as indicated by the UP, DWN, FWD and BWD arrows, respectively, in FIG. 2 and the rightward/leftward direction (hereinafter also referred to as a "horizontal direction") is defined as a direction perpendicular to the upward/downward direction (hereinafter also referred to as a "vertical direction") and the forward/backward direction. However, these directions are only an example and should not be construed as limiting the directions in which the image display system 1 is installed. It should also be noted that the arrows indicating the respective directions on the drawings are shown there only for the purpose of description and insubstantial ones.

In this embodiment, a plurality of (e.g., three) cameras 4 to shoot video presenting a rear view of the body 101 of the automobile 100 are provided on the body 101. FIGS. 4A-4C depict image frames G1, G2, and G3 shot by the three cameras 4, respectively. Specifically, the image frame G1 is an image frame shot by one camera 4 arranged on the left side of the automobile 100 to present a rear left view of the body 101, for example. The image frame G2 is an image frame shot by another camera 4 arranged at a horizontal center on the back of the body 101 of the automobile 100 to present a rear view of the body 101, for example. The image frame G3 is an image frame shot by the other camera 4 arranged on the right side of the automobile 100 to present a rear right view of the body 101, for example. In this embodiment, the number of the cameras 4 provided is three. However, this is only an example and should not be construed as limiting. Alternatively, only two cameras 4 may be provided or four or more cameras 4 may be provided as well.

In this embodiment, the three cameras 4 are arranged on the body 101 such that a region captured in the image frame G2 partially overlaps with a region captured in the image frame G1 and that another region captured in the image frame G2 partially overlaps with a region captured in the image frame G3. The image generation system 2 of this embodiment synthesizes together the image data of these image frames G1, G2, and G3 captured by the three cameras 4, thereby generating a panoramic (or wide-angle) synthetic image G4 (see FIG. 4D) in which the three image frames G1, G2, and G3 are merged together. Then, the image display system 1 presents the synthetic image G4, generated by the image generation system 2, on the display unit 3. This allows the user 200 (e.g., the driver) of the automobile 100 to monitor, based on the synthetic image G4 presented on the display unit 3, a situation behind the body 101 in a wide range.

(2.1) Configuration (2.1.1) Image Generation System

A configuration for the image generation system 2 according to this embodiment will be described with reference to FIGS. 1-3.

The image generation system 2 includes a software processing unit 10 and a hardware processing unit 20.

The software processing unit 10 is implemented as a microcomputer including a processor and a memory. That is to say, the software processing unit 10 is implemented as a computer system including a processor and a memory. In other words, the computer system performs the function of the software processing unit 10 by making the processor execute a predetermined program (including an image generation program). The program may be stored in advance in either the memory or may also be downloaded via a telecommunications line such as the Internet or distributed after having been stored on a non-transitory storage medium such as a memory card.

The software processing unit 10 also functions as an operation control unit 11 for controlling the operation of the hardware processing unit 20. The operation control unit 11 has the capability of loading setting information about specifics of the processing to be performed by the hardware processing unit 20 (including the first processing unit 50 and the second processing unit 60) into the hardware processing unit 20. Specifically, the operation control unit 11 generates a display list, which is a list of commands to be executed by the hardware processing unit 20, as the setting information. The operation control unit 11 writes the display list thus generated into a memory to which both the software processing unit 10 and the hardware processing unit 20 are accessible. That is to say, the operation control unit 11 serves as a setting information generation unit for generating the setting information. The operation control unit 11 serving as the setting information generation unit generates, during initialization and parameter setting, a display list in which a request from high-order software is optimized (e.g., by changing the order of processing for the purpose of pipeline processing) according to the specific resources of the hardware processing unit 20. This speeds up the operation of the overall system.

In addition, the operation control unit 11 also has the capability of giving a startup trigger to the hardware processing unit 20 to instruct the hardware processing unit 20 to start operating.

The hardware processing unit 20 includes a device driver for controlling the hardware (including the display unit 3 and the cameras 4) and an application programming interface (API). The API is an interface between the device driver and the high-order software processed by the software processing unit 10.

The hardware processing unit 20 performs the functions of the operation setting unit 30, the acquisition unit 40, the first processing unit 50, and the second processing unit 60.

The operation setting unit 30 acquires, from the operation control unit 11 of the software processing unit 10, setting information about the specifics of the processing to be performed by the first processing unit 50 and the second processing unit 60. In this embodiment, the operation setting unit 30 is loaded with a display list, read out from a memory that stores the display list as the setting information, to acquire the setting information from the operation control unit 11. On being loaded with the display list, the operation setting unit 30 decodes the display list and acquires a series of commands to be executed by the first processing unit 50 and the second processing unit 60. That is to say, the operation setting unit 30 functions as a decoding unit of outputting, on receiving the predetermined type of the setting information, the predetermined type of the setting information to the first processing unit 50 and the second processing unit 60.

In addition, on receiving a trigger signal from the operation control unit 11, the operation setting unit 30 outputs the trigger signal to the first processing unit 50 and the second processing unit 60 to make the first processing unit 50 and the second processing unit 60 start performing a series of processing defined by the setting information.

In this embodiment, the operation setting unit 30 decodes the display list (setting information) read out from the memory, thus acquiring the specifics of the processing to be performed by the first processing unit 50 and the second processing unit 60 and outputting the processing specifics thus acquired to the first processing unit 50 and the second processing unit 60. Also, on receiving a startup trigger from the operation control unit 11 after having provided the processing specifics for the first processing unit 50 and the second processing unit 60, the operation setting unit 30 makes the first processing unit 50 and the second processing unit 60 start processing in accordance with the specifics of the processing. The first processing unit 50 performs, in accordance with the setting information acquired by the operation setting unit 30, a predetermined type of image processing on the first image data acquired by the acquisition unit 40, thereby generating second image data. Meanwhile, the second processing unit 60 performs, in accordance with the setting information acquired by the operation setting unit 30, recognition processing on the second image data. That is to say, every time one image frame of the first image data is provided by each of the three cameras 4, the first processing unit 50 and the second processing unit 60 perform the predetermined type of the image processing in accordance with the series of commands that have been set. Thus, the software processing unit 10 (processor) only needs to give a startup trigger to the operation setting unit 30 and does not need to give any instruction to make the first processing unit 50 and the second processing unit 60 perform the predetermined type of the image processing each time. In other words, the software processing unit 10 (processor) does not have to wait for a completion signal to come from the first processing unit 50, thus curbing the decline in the processing speed of the software processing unit 10 (processor).

The acquisition unit 40 acquires the first image data captured by the cameras 4. In this embodiment, the three cameras 4 are provided for the body 101 to present a rear view of the body 101. The acquisition unit 40 has the capability of communicating with the three cameras 4 over an in-vehicle network provided inside the moving vehicle 100, for example. The three cameras 4 shoot video presenting a rear view of the body 101 at regular or irregular intervals. The acquisition unit 40 acquires the first image data from each of the three cameras 4 over the in-vehicle network. The acquisition unit 40 acquires multiple image frames represented by the first image data (i.e., the first group of image frames).

The first processing unit 50 serves as a graphics processing unit for performing graphics processing on the first image data acquired by the acquisition unit 40. The first processing unit 50 includes a pre-graphics processing unit 51 and a post-graphics processing unit 52.

The pre-graphics processing unit 51 generates the second image data by subjecting the first image data to the predetermined type of the image processing. In this embodiment, each of the cameras 4 includes a wide-angle lens to shoot a broader range, and therefore, the image shot by the camera 4 is distorted due to a property of such a lens. Thus, the pre-graphics processing unit 51 performs correction processing of correcting the image distortion on the first image data, thus generating second image data with reduced image distortion. In this embodiment, the acquisition unit 40 acquires multiple image frames represented by first image data and the pre-graphics processing unit 51 of the first processing unit 50 performs the image processing on each of the multiple image frames of the first image data acquired by the acquisition unit 40 to generate multiple image frames represented by second image data (i.e., the second group of image frames). The pre-graphics processing unit 51 generates corrected second image data by performing correction processing on the first image data of each of the image frames G1, G2, and G3.

The post-graphics processing unit 52 synthesizes, based on a result of matching provided by the second processing unit 60, multiple image frames of the image data that have been processed for display purposes by the pre-graphics processing unit 51, thus generating image data representing the synthetic image G4. Specifically, the post-graphics processing unit 52 generates the image data representing the synthetic image G4 by synthesizing the image frames G1, G2, and G3 together only when there is either a pixel or region subjected to the matching processing by the second processing unit 60 in the respective image frames G1, G2, and G3. The post-graphics processing unit 52 has the synthetic image G4 presented on the display unit 3 by outputting the image data representing the synthetic image G4 to the display unit 3. In this embodiment, the post-graphics processing unit 52 functions as a synthesis processing unit for generating synthetic image data by synthesizing together the second image data of two image frames to be matched one against the other, with respect to the feature point detected during the matching processing.

The second processing unit 60 serves as a recognition processing unit for performing recognition processing on the second image data that has been subjected to the predetermined type of the image processing by the first processing unit 50. The second processing unit 60 includes a search unit 61 and a matching unit 62. In this embodiment, the recognition processing by the second processing unit 60 includes search processing of searching the second image data for a feature quantity and matching processing of matching two image frames of interest one against the other with respect to the feature quantity found through the search processing.

The search unit 61 performs the search processing of searching the second image data provided by the pre-graphics processing unit 51 for a pixel or region where the feature quantity should be generated and feature quantity generation processing of generating a feature quantity in that pixel or region found through the search processing.

The search unit 61 cuts down the throughput of the matching processing by the matching unit 62 by narrowing down the given second image data to only a pixel or region that is the target of the search processing to generate the feature quantity. The search unit 61 searches for the target pixel or region, where the feature quantity is generable, by performing at least one detection processing selected from the group consisting of edge detection processing, corner detection processing, object detection processing, person detection processing, and face detection processing on the second image data. As used herein, the "edge detection processing" refers to processing of detecting, using a differential filter, for example, an image portion where the density or brightness of each pixel changes steeply from the given second image data. The "corner detection processing" refers herein to processing of detecting a corner where two edges intersect with each other. The "object detection processing" refers herein to processing of detecting a pixel or region representing an object (which may be a still object, a moving object, or any other type of object) from the second image data by extracting a moving area of a predetermined size and shape from the second image data, for example. The "person detection processing" refers herein to processing of detecting a pixel or region representing a person from the second image data by extracting a moving area of a predetermined size and shape from the second image data, for example. The "face detection processing" refers herein to processing of detecting a pixel or region representing a person's face from the second image data by extracting a moving area of a predetermined size and shape from the second image data, for example.

In addition, the search unit 61 also performs, on finding, through the search processing, the target pixel or region where the feature quantity is to be generated, the processing of generating the feature quantity in that target pixel or region found through the search processing. In this embodiment, the search unit 61 performs the search processing of searching two image frames of interest, selected as image frames to be matched one against the other from the second group of image frames, for the feature quantity. The search unit 61 may generate, for example, a local feature quantity for use in stitching processing as the feature quantity for the pixel (detection point) thus found. Examples of local feature quantities include an oriented fast and rotated brief (ORB) feature quantity, a scale invariant feature transform (SIFT)

feature quantity, and a speed upped robust feature (SURF) feature quantity. The search unit 61 may generate, as the feature quantity of the region thus found through the search processing, a global feature quantity such as a color average or a histogram. Alternatively, the search unit 61 may also generate, as the feature quantity, the coordinates of an end point such an edge or a corner found through the search processing. Still alternatively, the search unit 61 may also generate, as the feature quantity of the region thus found through the search processing, a color value of that region or a manipulated value obtained from the color value (such as the square of the color value, an encoded color value, or a value obtained by subjecting the color value to Fourier transform). Yet alternatively, the search unit 61 may further generate, as the feature quantity of the pixel or region thus found through the search processing, a keyword associated with that pixel or region. Optionally, the search unit 61 may also generate, in combination, two or more selected from the group consisting of a local feature quantity, a global feature quantity, the coordinates of the end point, a color value of the region found through searching, a manipulated value obtained from the color value, and a keyword associated with the pixel or region found through searching.

The matching unit 62 performs matching processing on the respective second image data of two image frames, selected as image frames of interest from the three image frames G1, G2, and G3, each presenting one frame of the video shot, with respect to the feature quantity found through searching processing by the search unit 61. In this embodiment, two partially overlapping image frames, selected from the three image frames G1, G2, and G3, each presenting one frame of the video shot (namely, a pair of the image frames G1 and G2 or a pair of the image frames G2 and G3) are image frames to be matched one against the other (i.e., image frames of interest). The matching unit 62 performs the matching processing on the two image frames of interest only when the feature quantity is detected from the two image frames of interest.

The matching unit 62 may perform the matching processing by determining, with respect to the ORB feature quantity extracted from the second image data of the two image frames of interest, whether or not the hamming distance between their binary values is less than a predetermined first threshold value. Alternatively, the matching unit 62 may also perform the matching processing by determining, with respect to the SIFT or SURF feature quantity extracted from the second image data of the two image frames of interest, whether or not the difference between their vector values is less than a predetermined second threshold value. Still alternatively, the matching unit 62 may perform the matching processing by making template matching with respect to the feature quantity extracted from the second image data of the two image frames of interest. Yet alternatively, the matching unit 62 may also perform the matching processing on the keywords obtained from the second image data of the two image frames of interest. Optionally, the matching unit 62 may perform, in combination, two or more selected from these various types of matching processing.

As can be seen, the matching unit 62 of this embodiment detects a feature point, commonly present in both of the two image frames of interest, by matching the two image frames of interest one against the other with respect to the feature quantity found through the search processing.

(2.1.2) Image Display System

The image display system 1 includes the image generation system 2 and the display unit 3 for displaying the image data generated by the image generation system 2. In other words, the image generation system 2 and the display unit 3 together form the image display system 1.

The display unit 3 includes, for example, a display device with a reduced thickness (or depth) such as a liquid crystal display (LCD) or an organic electroluminescent (OEL) display. The display unit 3 receives image data of the synthetic image G4 from the post-graphics processing unit 52, and displays, based on the image data provided by the post-graphics processing unit 52, the synthetic image G4 on its screen.

Figure 3:
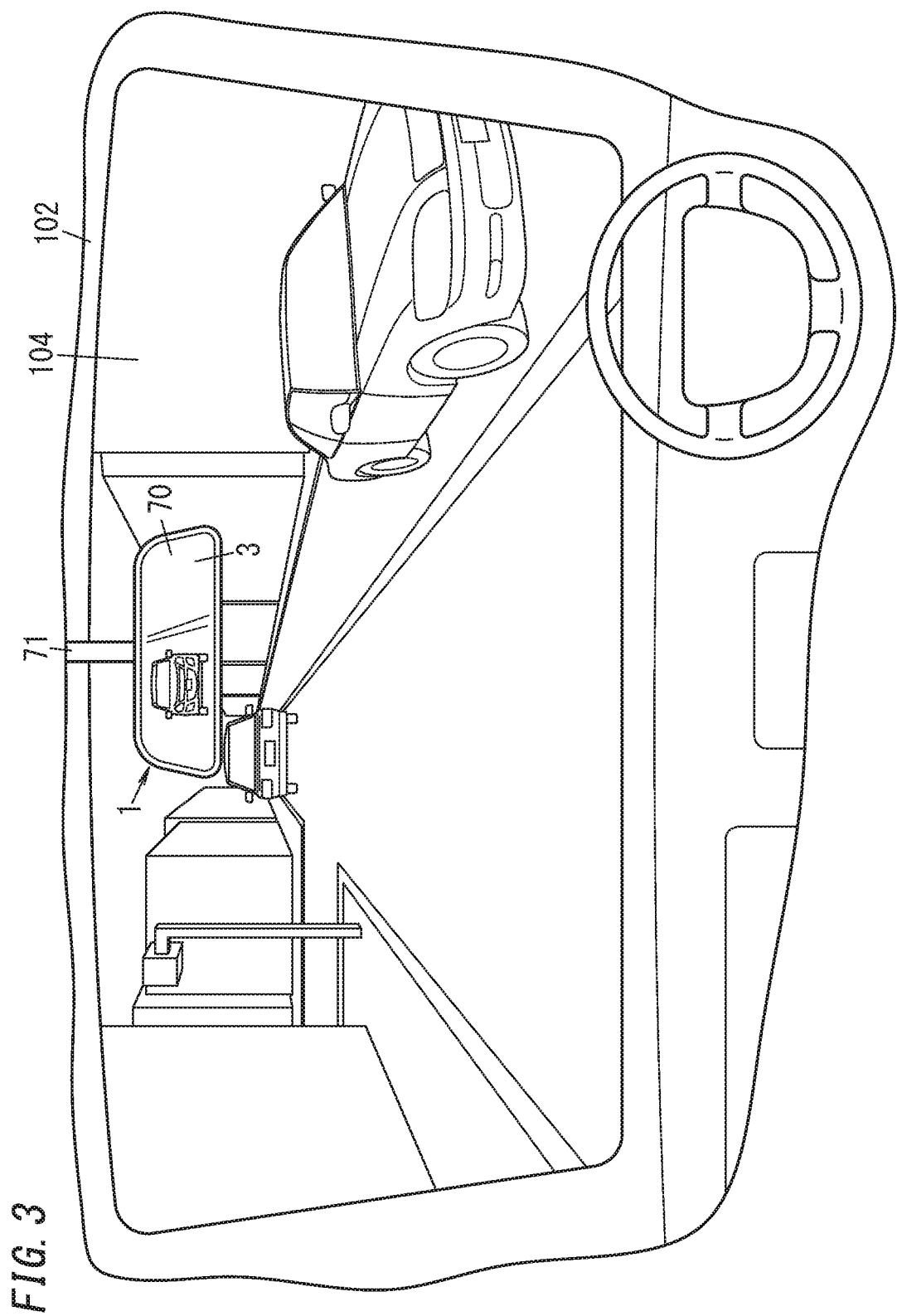
FIG. 3 depicts a front view for a user seated in the driver's seat of the moving vehicle including the image display system.

The image display system 1 further includes a housing 70 that houses the image generation system 2, the display unit 3, and other members (see FIGS. 2 and 3). The housing 70 may be a molded product of a synthetic resin, for example. The housing 70 has an opening on the back surface thereof. The opening of the housing 70 mounts the display unit 3.

The housing 70 is installed on a front portion, located close to a windshield 104, of the roof 102 of the body 101 of the moving vehicle 100 so as to come into sight of the user 200 seated on the driver's seat 103 and facing front. The housing 70 is mounted via a supporting bar 71 with a ball joint onto the roof 102 of the body 101 so as not to obstruct the user's 200 front sight.

(2.2) Operation

Next, it will be described with reference to FIGS. 5-10 how respective constituent elements of the image generation system 2 according to this embodiment operate.

(2.2.1) Operation of Operation Control Unit

Figure 5:
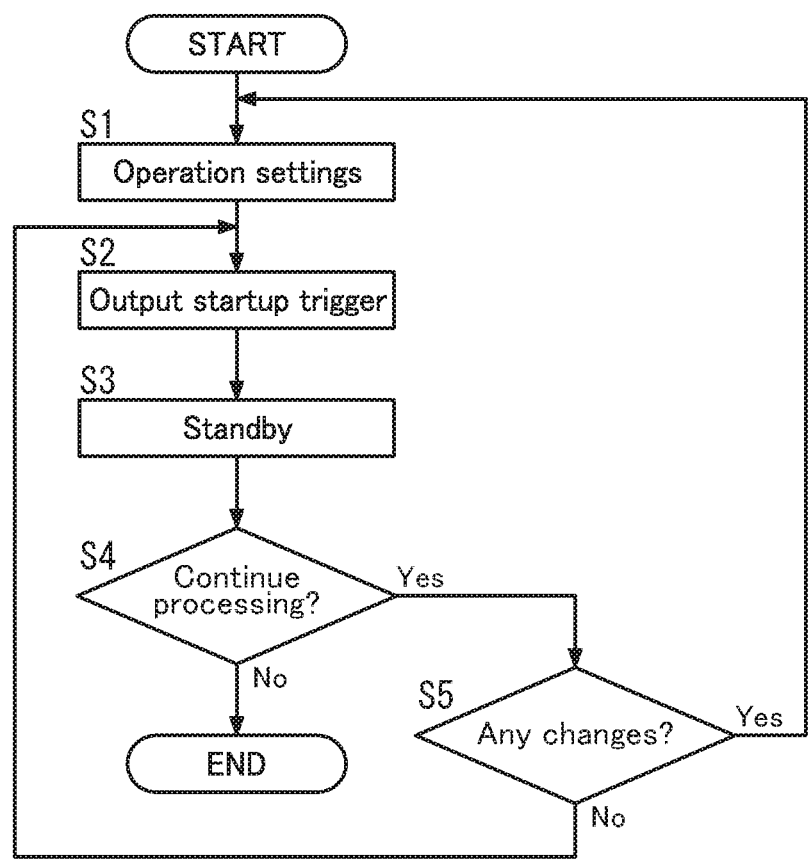
FIG. 5 is a flowchart illustrating how an operation control unit included in the image generation system operates.

First, the operation of the operation control unit 11 included in the software processing unit 10 will be described with reference to FIG. 5.

When the software processing unit 10 executes high-order software to perform an image synthesis operation of synthesizing together three image frames captured respectively by three cameras 4 in accordance with the instruction of the high-order software and displaying a resultant synthetic image on the display unit 3, the operation control unit 11 of the software processing unit 10 loads the specifics of the processing to be performed into the hardware processing unit 20.

The operation control unit 11 generates setting information, specifying the specifics of the processing to be performed by the hardware processing unit 20, and enters the setting information thus generated into the hardware processing unit 20 (in Step S1). Specifically, the operation control unit 11 generates a display list as a list of a series of commands to be executed by the first processing unit 50 and second processing unit 60 of the hardware processing unit 20, and writes the display list into a memory to which both the software processing unit 10 and the hardware processing unit 20 are accessible.

On entering the setting information into the hardware processing unit 20, the operation control unit 11 outputs a startup trigger to the hardware processing unit 20 to make the hardware processing unit 20 start the operation of synthesizing together the image frames captured by the three cameras 4 and displaying a resultant synthetic image on the display unit 3 (in Step S2).

The operation control unit 11 enters, on outputting the startup trigger, a standby state to wait for a synthesis completion signal to come from the hardware processing unit 20 (in Step S3). The synthesis completion signal is a signal indicating that one frame of the synthetic image has been generated.

On receiving the synthesis completion signal from the hardware processing unit 20, the operation control unit 11 decides whether or not to continue the processing (in Step S4).

If the operation control unit 11 has received no instruction to end the image synthesis operation from the high-order software, then the operation control unit 11 determines that the processing should be continued (i.e., the answer is YES in Step S4) and determines whether or not there is any change to the setting information (in Step S5). On finding that an update condition that an instruction to change the setting information should be received from the high-order software is satisfied, the operation control unit 11 determines that the setting information should have been changed (i.e., the answer is YES in Step S5). On the other hand, on finding the update condition not satisfied, the operation control unit 11 determines that the setting information should not have been changed (i.e., the answer is NO in Step S5). If the setting information has been changed, the operation control unit 11 goes back to the processing step S1 to continue the processing. On the other hand, unless the setting information has been changed, the operation control unit 11 goes back to the processing step S2 to continue the processing.

Meanwhile, on finding, in Step S4, that no instruction to end the image synthesis operation has been received from the high-order software, the operation control unit 11 outputs an end instruction to the operation setting unit 30 of the hardware processing unit 20 to end the processing (i.e., the answer is NO in Step S4).

(2.2.2) Operation of Operation Setting Unit

Figure 6:
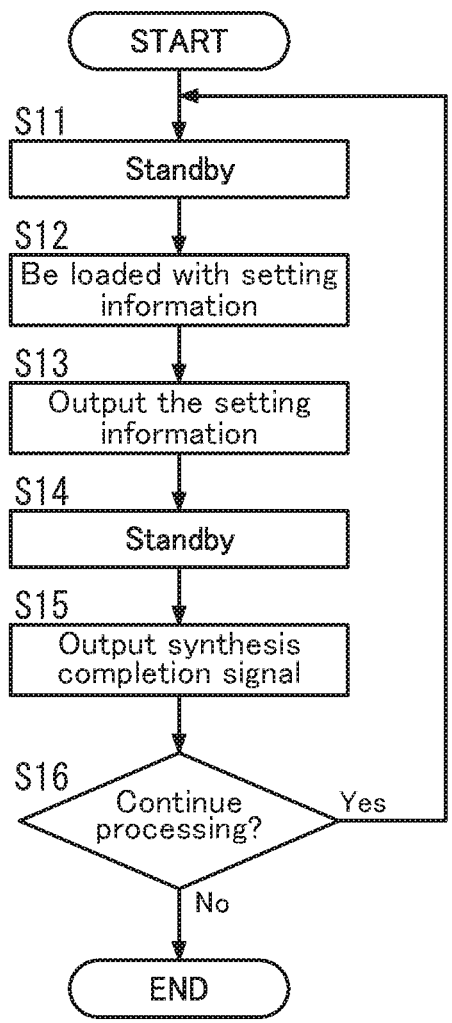
FIG. 6 is a flowchart illustrating how an operation setting unit included in the image generation system operates.

Next, it will be described with reference to FIG. 6 how the operation setting unit 30 included in the hardware processing unit 20 operates.

Once the image generation system 2 has started operating, the operation setting unit 30 enters a standby state to wait for a startup trigger to come from the operation control unit 11 of the software processing unit 10 (in Step S11).

On receiving the startup trigger from the operation control unit 11, the operation setting unit 30 is loaded with the display list (setting information) retrieved from the memory (in Step S12).

The operation setting unit 30 decodes the display list loaded from the memory and outputs the display list decoded to the first processing unit 50 and the second processing unit 60 (in Step S13). This allows a command that a series of processing should be executed to be entered into the API that each of the first processing unit 50 and second processing unit 60 includes.

Thereafter, the operation setting unit 30 enters a standby state to wait for a completion signal to come from the first processing unit 50 and second processing unit 60 (in Step S14). The first processing unit 50 and second processing unit 60 output, when processing on one frame of the video shot is completed, the completion signal to the operation setting unit 30.

Then, on receiving the completion signal from the first processing unit 50 and second processing unit 60, the operation setting unit 30 outputs a synthesis completion signal, indicating that multiple image frames, each presenting one frame of the video, have been synthesized together, to the operation control unit 11 of the software processing unit 10 (in Step S15) to decide whether or not to continue the processing (in Step S16).

If the operation setting unit 30 has received no end signal from the operation control unit 11 of the software processing unit 10, then the operation setting unit 30 determines that the processing should be continued (i.e., the answer is YES in Step S16) and goes back to the processing step S11 to continue the processing. On the other hand, if the operation setting unit 30 has received the end signal from the operation control unit 11 of the software processing unit 10, then the operation setting unit 30 ends the processing (i.e., the answer is NO in Step S16) and forwards the end signal to the first processing unit 50 and the second processing unit 60 to end the image synthesis processing by the first processing unit 50 and the second processing unit 60.

As can be seen from the foregoing description, on finding a predetermined update condition satisfied, the operation control unit 11 changes the setting information and stores the updated setting information in the memory. Thus, when the predetermined update condition is satisfied, the operation setting unit 30 is loaded, from the memory, with the setting information changed by the operation control unit 11, and therefore, updates the setting information and enters the updated setting information into the first processing unit 50 and second processing unit 60.

In this embodiment, even when the setting information is updated, the operation control unit 11 of the software processing unit 10 also generates a display list based on the updated setting information and also writes the updated display list into a memory, to which both the software processing unit 10 and the hardware processing unit 20 are accessible. When the processing is started next time, the hardware processing unit 20 acquires the display list from the memory and operates in accordance with the updated display list. This allows the setting information to be updated even without establishing synchronization between the software processing unit 10 and the hardware processing unit 20, thus curbing the decline in the processing speed of the overall system.

(2.2.3) Operation of Pre-Graphics Processing Unit)

Figure 7:
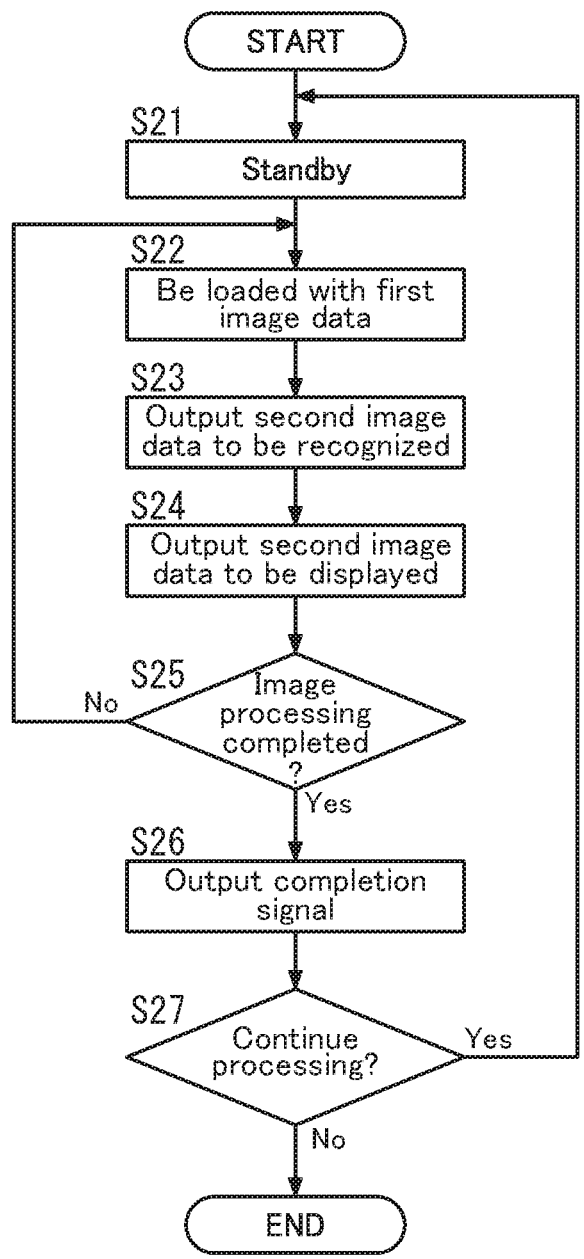
FIG. 7 is a flowchart illustrating how a pre-graphics processing unit included in the image generation system operates.

Next, it will be described with reference to FIG. 7 how the pre-graphics processing unit 51 of the first processing unit 50 operates.

When the image generation system 2 starts operating, the pre-graphics processing unit 51 enters a standby state to wait for the operation setting unit 30 to provide the setting information (in Step S21).

On receiving the setting information from the operation setting unit 30, the pre-graphics processing unit 51 starts performing a series of processing (that begins with the processing step S22) in accordance with the setting information.

The pre-graphics processing unit 51 is loaded with one frame of the first image data after another, read out as image data to be processed, by the acquisition unit 40 (in Step S22). Specifically, the pre-graphics processing unit 51 is sequentially loaded with the image frames G1, G2, and G3 of the first image data by the acquisition unit 40.

The pre-graphics processing unit 51 subjects the first image data representing the image frames G1, G2, and G3 to a predetermined type of image processing to generate second image data to be recognized by the second processing unit 60 and output the second image data to the search unit 61 (in Step S23). In this embodiment, the image processing performed by the pre-graphics processing unit 51 to generate the second image data to be recognized may be distortion correction processing of correcting the image distortion caused by a wide-angle lens, for example. However, this is only an example and should not be construed as limiting. Examples of alternative image processing include projection conversion processing of converting the viewpoint, image pyramid generation processing of generating an image pyramid, and trimming processing of cutting out an image portion falling within the range to be searched by the search unit 61. The image processing may also be a monochrome image conversion processing of converting a color image into a monochrome image, color space conversion processing of converting the color space of the first image data, filtering processing of processing the image data through a predetermined filter, or contrast adjustment processing of adjusting the contrast. Optionally, the pre-graphics processing unit 51 may also perform, in combination, two or more selected from the group consisting of the distortion correction processing, the projection conversion processing, the image pyramid generation processing, the trimming processing, the monochrome image conversion processing, the color space conversion processing, the filtering processing, and the contrast adjustment processing.

The pre-graphics processing unit 51 also subjects the first image data representing the image frames G1, G2, and G3 to image processing for display purposes, thus generating second image data to be displayed and outputting the second image data to the post-graphics processing unit 52 (in Step S24). Examples of the image processing for display purposes include not only the distortion correction processing, projection conversion processing, trimming processing, color space conversion processing, filtering processing, and contrast adjustment processing described above, but also MIP map generation processing of generating a MIP map and cube map generation processing of generating a cube map. Optionally, the pre-graphics processing unit 51 may also perform, in combination, two or more selected from the group consisting of the distortion correction processing, the projection conversion processing, the MIP map generation processing, the cube map generation processing, the trimming processing, the color space conversion processing, the filtering processing, and the contrast adjustment processing.

The pre-graphics processing unit 51 performs this series of processing steps S22-S24 over and over again until the pre-graphics processing unit 51 finishes processing each and every piece of the first image data representing the image frames G1, G2, and G3.

Then, on finishing processing each and every piece of the first image data representing the image frames G1, G2, and G3 (i.e., if the answer is YES in Step S25), the pre-graphics processing unit 51 outputs a completion signal to the operation setting unit 30 (in Step S26) and decides whether or not to continue the processing (in Step S27).

If the pre-graphics processing unit 51 has received no end signal from the operation setting unit 30, then the pre-graphics processing unit 51 determines that the processing should be continued (i.e., the answer is YES in Step S27) and goes back to the processing step S21 to continue the processing. On the other hand, if the pre-graphics processing unit 51 has received an end signal from the operation setting unit 30, then the pre-graphics processing unit 51 determines that the processing should end (i.e., the answer is NO in Step S27) to end the image processing of the first image data.

(2.2.4 Operation of Search Unit)

Figure 8:
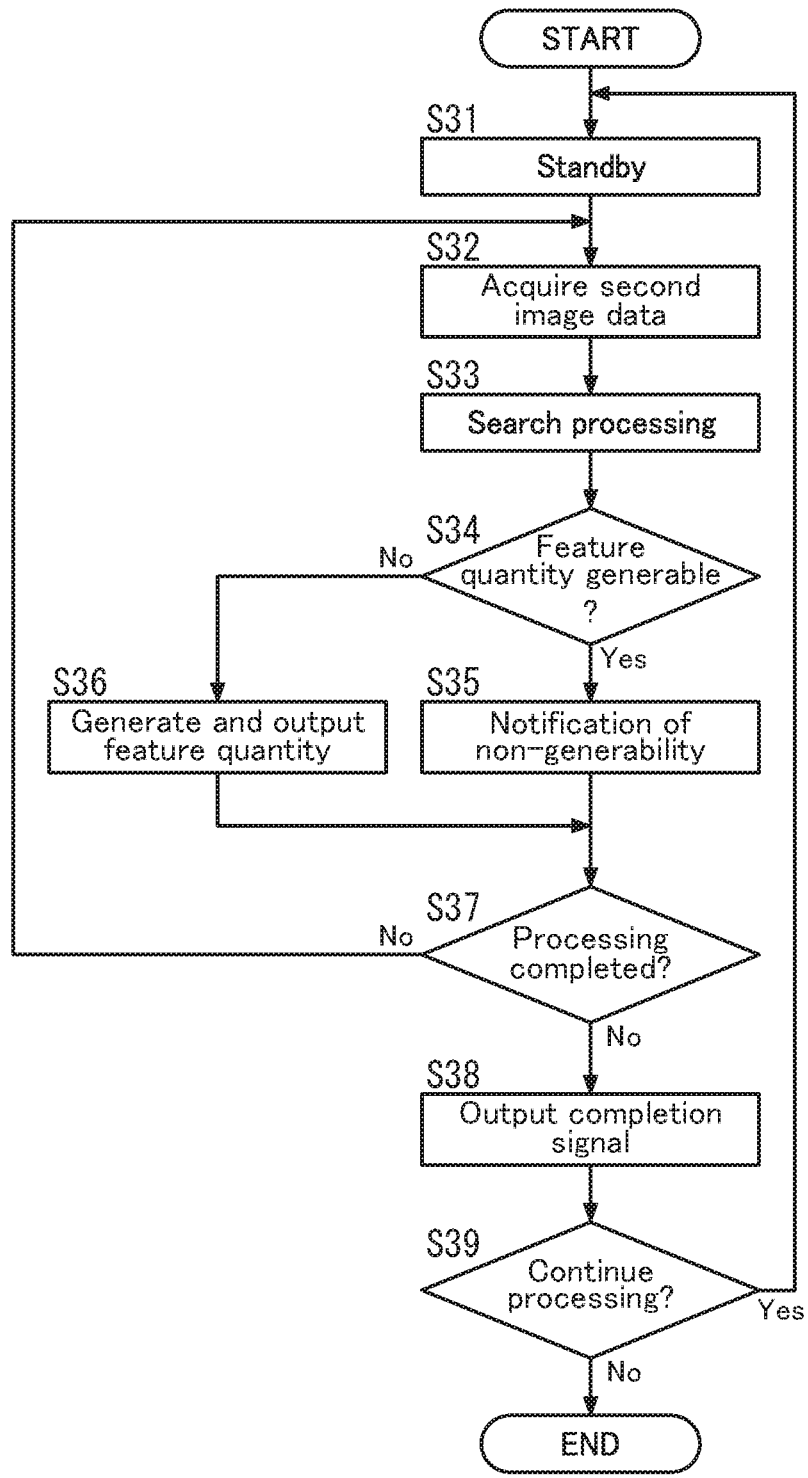
FIG. 8 is a flowchart illustrating how a search unit included in the image generation system operates.

Next, it will be described with reference to FIG. 8 how the search unit 61 of the second processing unit 60 operates.

When the image generation system 2 starts operating, the search unit 61 enters a standby state to wait for the operation setting unit 30 to provide the setting information (in Step S31).

On receiving the setting information from the operation setting unit 30, the search unit 61 starts performing a series of processing (that begins with the processing step S32) in accordance with the setting information.

The search unit 61 acquires the second image data corresponding to one frame for each of the image frames G1, G2, and G3 from the pre-graphics processing unit 51 (in Step S32). The search unit 61 performs search processing of searching the second image data representing each of the image frames G1, G2, and G3 for a pixel or region where the feature quantity needs to be generated (in Step S33). In this processing step, the search unit 61 searches for the pixel or region where the feature quantity is generable by performing, on the second image data, at least one type of detection processing, selected from the group consisting of the edge detection processing, corner detection processing, object detection processing, person detection processing, and face detection processing described above.

The search unit 61 determines, based on the result of the search processing, whether or not one or more feature quantities are generable (in Step S34).

On determining that one or more feature quantities should be generable (if the answer is YES in Step S34), the search unit 61 generates feature quantities and output the feature quantities to the matching unit 62 (in Step S35). Examples of the feature quantities to be generated in this processing step include the local feature quantity of the detection point, the global feature quantity of the region searched through the search processing, the coordinates of an end point such as an edge or a corner, a color value of the searched region or a manipulated value extracted from the color value, and the keyword associated with the pixel or region found through the search processing. Optionally, the search unit 61 may also generate, in combination, two or more selected from the group consisting of the local feature quantity of the detection point, the global feature quantity of the region searched, the coordinates of an end point such as an edge or a corner, a color value of the searched region or a manipulated value extracted from the color value, and the keyword associated with the pixel or region found through the search processing.

On the other hand, on finding that no pixel or region where the feature quantities are generable has been found as a result of the search processing, the search unit 61 determines that the no feature quantities are generable (i.e., the answer is NO in Step S34) and outputs a notification signal, indicating that no feature quantities are generable, to the matching unit 62 (in Step S36).

Then, on finishing performing either the processing step S35 or the processing step S36, the search unit 61 determines whether or not the search unit 61 has processed each and every piece of the second image data representing the image frames G1, G2, and G3 yet (in Step S37).

On determining that the search unit 61 has not processed each and every piece of the second image data yet (if the answer is NO in Step S37), the search unit 61 performs this series of processing that begins with the processing step S32 over and over again until the search unit 61 finishes processing each and every piece of the second image data representing the image frames G1, G2, and G3.

On the other hand, on determining that the search unit 61 has processed each and every piece of the second image data representing the image frames G1, G2, and G3 (if the answer is YES in Step S37), the search unit 61 outputs a completion signal to the operation setting unit 30 (in Step S38) and decides whether or not to continue the processing (in Step S39).

If the search unit 61 has received no end signal from the operation setting unit 30 (i.e., if the answer is YES in Step S39), then the search unit 61 goes back to the processing step S31 to continue the processing. On the other hand, if the search unit 61 has received an end signal from the operation setting unit 30 (if the answer is NO in Step S39), then the search unit 61 ends the search processing.

(2.2.5 Operation of Matching Unit)

Figure 9:
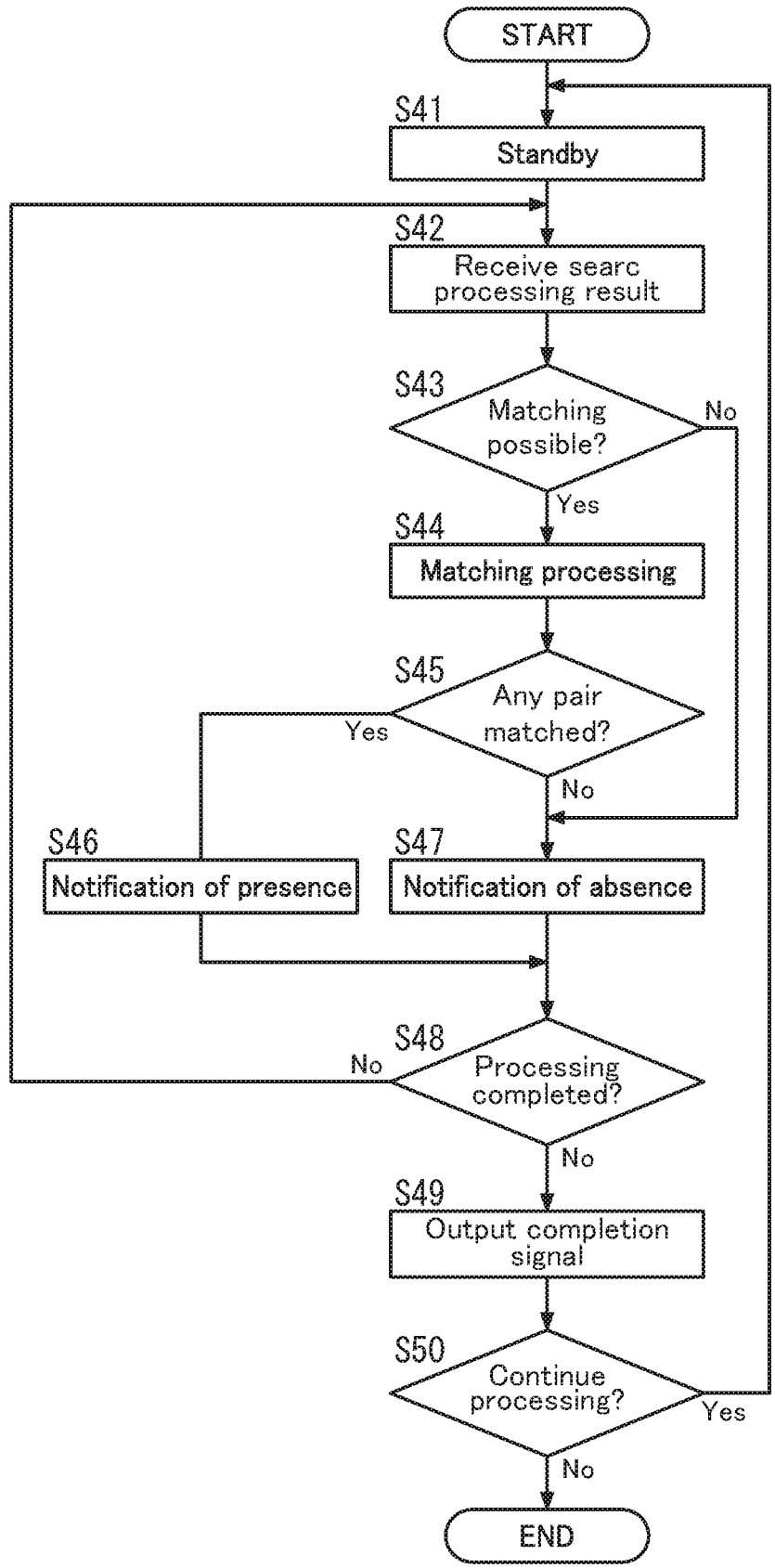
FIG. 9 is a flowchart illustrating how a matching unit included in the image generation system operates.

Next, it will be described with reference to FIG. 9 how the matching unit 62 of the second processing unit 60 operates.

When the image generation system 2 starts operating, the matching unit 62 enters a standby state to wait for the operation setting unit 30 to provide the setting information (in Step S41).

On receiving the setting information from the operation setting unit 30, the matching unit 62 start performing a series of processing (that begins with the processing step S42) in accordance with the setting information.

The matching unit 62 receives, from the search unit 61, the result of the search processing performed on the image frames G1, G2, and G3 to be matched one against the other (in Step S42). If the search unit 61 has generated a feature quantity during the search processing, then the matching unit 62 receives, as the result of the search processing, the feature quantity from the search unit 61. On the other hand, if the search unit 61 has failed to generate any feature quantity during the search processing, then the matching unit 62 receives, as the result of the search processing, a notification that there are no feature quantities, from the search unit 61.

At this time, the matching unit 62 determines whether or not matching processing may be performed on two image frames of interest (namely, a pair of image frames G1 and G2 or a pair of image frames G2 and G3) selected from the three image frames G1, G2, and G3 (in Step S43).

On finding that there are no feature quantities in at least one of the two image frames of interest, the matching unit 62 determines that the matching processing should be unable to be performed (the answer is NO in Step S43) and the process proceeds to the processing step S47.

On the other hand, on finding that there is a feature quantity in each of the two image frames of interest, the matching unit 62 determines that matching processing should be able to be performed (the answer is YES in Step S43) and performs the matching processing (in Step S44).

The matching unit 62 performs matching processing on two image frames of interest, selected from the three image frames G1, G2, and G3, with respect to the feature quantity found by the search unit 61. For example, the matching unit 62 may perform the matching processing by determining, with respect to the ORB feature quantity extracted from the second image data representing the two image frames of interest, whether or not the hamming distance between the binary values is less than a first threshold value. Alternatively, the matching unit 62 may also perform the matching processing by determining, with respect to the SIFT or SURF feature quantity extracted from the second image data representing the two image frames of interest, whether or not the difference between the vector values is less than a second threshold value. Still alternatively, the matching unit 62 may also perform the matching processing by making template matching with respect to the feature quantity extracted from the second image data representing the two image frames of interest. Yet alternatively, the matching unit 62 may also perform the matching processing on the keywords obtained from the second image data representing the two image frames of interest. Optionally, the matching unit 62 may perform, in combination, two or more selected from these various types of matching processing.

If necessary, the matching unit 62 may delete any results of matching, which are determined to be abnormal values, after having performed the matching processing. Specifically, on finding its difference from the median greater than a predetermined third threshold value, the matching unit 62 may regard the result of matching as an abnormal value. Alternatively, on finding the difference between the result of matching with respect to an earlier frame and the result of matching with respect to the current frame greater than a predetermined fourth threshold value, the matching unit 62 may determine the result of matching for the current frame to be an abnormal value.

After having performed the matching processing, the matching unit 62 determines whether or not there is any pair of matched pixels or regions in the two image frames of interest (in Step S45). As used herein, the "pair of matched pixels or regions" refers to a situation where the pair of pixels or regions in the two image frames of interest is determined to be a pair of pixels or regions representing the same object captured in both of the two image frames.

On finding that there is any pair of matched pixels or regions (if the answer is YES in Step S45), the matching unit 62 notifies the post-graphics processing unit 52 of the presence of the pair of matched pixels or regions (in Step S46).

On the other hand, on finding that there are no pairs of matched pixels or regions (if the answer is NO in Step S45), the matching unit 62 notifies the post-graphics processing unit 52 of the absence of any pair of matched pixels or regions (in Step S47).

Then, on finishing performing either the processing step S46 or the processing step S47, the matching unit 62 determines whether or not the matching unit 62 has processed each and every piece of the second image data representing the image frames G1, G2, and G3 yet (in Step S48).

On determining that the matching unit 62 has not processed each and every piece of the second image data yet (if the answer is NO in Step S48), the matching unit 62 performs this series of processing that begins with the processing step S42 over and over again until the matching unit 62 finishes processing each and every piece of the second image data representing the image frames G1, G2, and G3.

On the other hand, on determining that the matching unit 62 has processed each and every piece of the second image data representing the image frames G1, G2, and G3 (if the answer is YES in Step S48), the matching unit 62 outputs a completion signal to the operation setting unit 30 (in Step S49) and decides whether or not to continue the processing (in Step S50).

If the matching unit 62 has received no end signal from the operation setting unit 30 (i.e., the answer is YES in Step S50), then the matching unit 62 goes back to the processing step S41 to continue the processing. On the other hand, if the matching unit 62 has received an end signal from the operation setting unit 30 (if the answer is NO in Step S50), then the matching unit 62 ends the matching processing.

(2.2.6 Operation of Post-Graphics Processing Unit)

Figure 10:
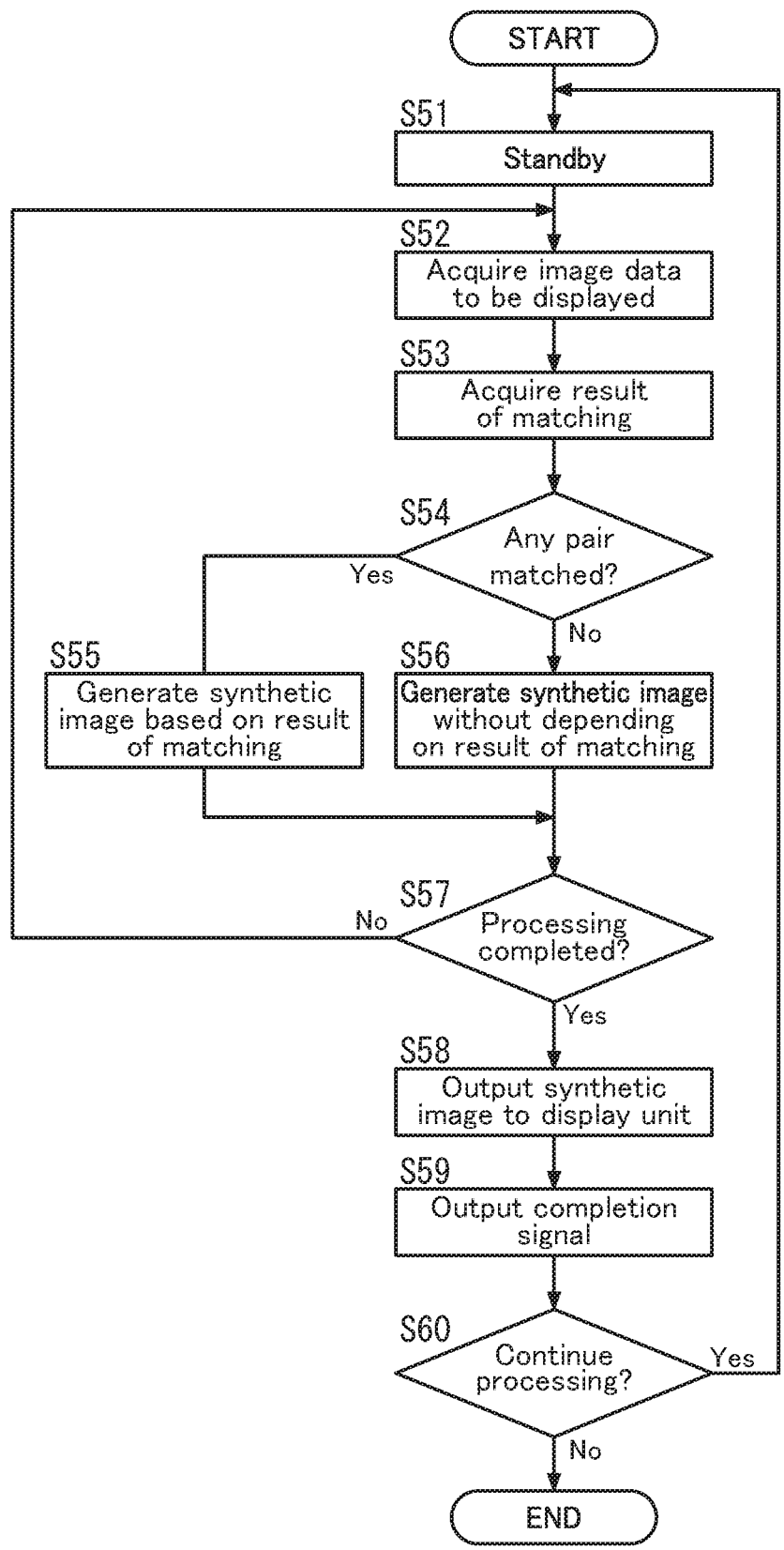
FIG. 10 is a flowchart illustrating how a post-graphics processing unit included in the image display system operates.

Next, it will be described with reference to FIG. 10 how the post-graphics processing unit 52 of the first processing unit 50 operates.

When the image generation system 2 starts operating, the post-graphics processing unit 52 enters a standby state to wait for the operation setting unit 30 to provide the setting information (in Step S51).

On receiving the setting information from the operation setting unit 30, the post-graphics processing unit 52 starts performing a series of processing (that begins with the processing step S52) in accordance with the setting information.

The post-graphics processing unit 52 acquires, with respect to the first image data representing the image frames G1, G2, and G3, the second image data to be displayed, which has been subjected to image processing for display purposes, from the pre-graphics processing unit 51 (in Step S52).

In addition, the post-graphics processing unit 52 acquires, from the matching unit 62, the result of matching that has been performed on the two image frames of interest (namely, either the pair of the image frames G1 and G2 or the pair of the image frames G2 and G3) (in Step S53). If the result of the matching processing reveals that there is a pair of matched pixels or regions, then the post-graphics processing unit 52 acquires, as the result of the matching processing, information (such as coordinates) about the pair of matched pixels or regions from the matching unit 62. On the other hand, if the result of the matching processing reveals that there are no pairs of matched pixels or regions, then the post-graphics processing unit 52 is notified of the absence of the pair of matched pixels or regions by the matching unit 62.

In this processing step, the post-graphics processing unit 52 determines, based on the result of the matching processing, whether or not there is any pair of matched pixels or regions in the two image frames of interest (namely, the pair of the image frames G1 and G2 or the pair of the image frames G2 and G3) (in Step S54).

On finding that there is a pair of matched pixels or regions in the two image frames of interest (if the answer is YES in Step S54), the post-graphics processing unit 52 generates, based on the result of the matching, image data for a synthetic image by synthesizing together the two image frames of interest (in Step S55). In this processing step, the post-graphics processing unit 52 may generate image data for the synthetic image so as to indicate, on the synthetic image, the fact that a match has been found, what pair of pixels or regions matches each other, what objects match each other, or what persons or what faces match each other.

On the other hand, on finding that there are no pairs of matched pixels or regions in the two image frames of interest (if the answer is NO in Step S54), the post-graphics processing unit 52 generates image data for a synthetic image by synthesizing together the two image frames of interest, without depending on the result of matching (in Step S56). The post-graphics processing unit 52 may generate image data for a synthetic image by synthesizing together the two image frames of interest based on shooting conditions such as the installation locations of the three cameras 4 and shooting directions thereof. The post-graphics processing unit 52 may generate image data for the synthetic image by synthesizing together the two image frames of interest by reference to the result of past matching processing. Optionally, the post-graphics processing unit 52 may generate image data for the synthetic image so as to indicate, on the synthetic image, the fact that no pairs of matched pixels or regions have been found in the two image frames of interest.

Then, on finishing performing either the processing step S55 or the processing step S56, the post-graphics processing unit 52 decides whether or not the post-graphics processing unit 52 has performed the synthesis processing on each and every piece of the image data to be displayed in the image frames G1, G2, and G3 yet (in Step S57).

On determining that the post-graphics processing unit 52 has not finished the synthesis processing yet (if the answer is NO in Step S57), the post-graphics processing unit 52 performs this series of processing that begins with the processing step S52 over and over again until the post-graphics processing unit 52 finishes performing the synthesis processing on each and every piece of the image data to be displayed in the image frames G1, G2, and G3.

On the other hand, on determining that the post-graphics processing unit 52 has performed the synthesis processing on each and every piece of the image data to be displayed in the image frames G1, G2, and G3 (if the answer is YES in Step S57), the post-graphics processing unit 52 outputs the image data for the synthetic image G4 to the display unit 3 (in Step S58) to have one frame of the synthetic image G4 presented on the display unit 3.

In addition, the post-graphics processing unit 52 also outputs a completion signal, indicating that one frame of the synthetic image G4 has been output, to the operation setting unit 30 (in Step S59) and decides whether or not to continue the processing (in Step S60).

If the post-graphics processing unit 52 has received no end signal from the operation setting unit 30 (i.e., the answer is YES in Step S60), then the post-graphics processing unit 52 goes back to the processing step S51 to continue the processing. On the other hand, if the post-graphics processing unit 52 has received an end signal from the operation setting unit 30 (if the answer is NO in Step S60), then the post-graphics processing unit 52 ends the image synthesis processing.

The image generation system 2 of this embodiment operates as described above. In the image generation system 2 of this embodiment, a setting unit for entering the specifics of processing into the first processing unit 50 including an API for graphics processing and another setting unit for loading the specifics of processing into the second processing unit 60 including an API for stitching processing are integrated together. In other words, pieces of setting information such as display lists are merged together in the graphics processing API included in the first processing unit 50 and the graphics processing API included in the second processing unit 60. The display lists suitably include, in advance, pieces of setting information for use in Steps S46 and S47, which branch off from Step S45 in accordance with the decision made by the matching unit 62, and pieces of setting information for use in Steps S55 and S56, which branch off from Step S54 in accordance with the decision made by the post-graphics processing unit 52. This allows the matching unit 62 and the post-graphics processing unit 52 to operate based on the settings for the respective processing steps that have branched off in accordance with the decision made on the results obtained by their preceding circuits. Then, when the operation control unit 11 of the software processing unit 10 gives a startup trigger to the hardware processing unit 20, the first processing unit 50 and the second processing unit 60 perform the image synthesis operation in synchronization with each other in accordance with the display list. This eliminates the need for the software processing unit 10 to postpone instructing the second processing unit 60 to start processing until the first processing unit 50 notifies the software processing unit 10 of completion of processing. That is to say, the software processing unit 10 does not have to wait for the first processing unit 50 to complete its processing. This curbs the decline in the processing speed of the software processing unit 10.

The present inventors carried out a simulation to confirm how long it would take for the image generation system 2 of this embodiment and a comparative example to complete the synthesis processing of generating the synthetic image G4 by synthesizing together the image data of the three image frames G1, G2, and G3. Note that the comparative example is an image generation system, of which the processor (software processing unit 10) is configured to instruct the second processing unit 60 to start its processing when notified of completion of processing by the first processing unit 50. The results are as follows. Specifically, when the processing load on the software processing unit 10 was relatively light, the amount of time it took for the comparative example to complete one cycle of synthesis processing was 4.96 ms, while the amount of time it took for the image generation system 2 of this embodiment to complete one cycle was 4.34 ms, which indicates that the system of this embodiment shortened the processing time by 14.3%. On the other hand, when the processing load on the software processing unit 10 was relatively heavy, the amount of time it took for the comparative example to complete one cycle of synthesis processing was 6.15 ms, while the amount of time it took for the image generation system 2 of this embodiment to complete one cycle was 5.53 ms, which indicates that the system of this embodiment shortened the processing time by 11.2%.

(3) Variations

The embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the image generation system 2 or the image display system 1 may be implemented as an image generation method, an image generation program (computer program), or a non-transitory storage medium that stores the image generation program thereon, for example. An image generation method according to an aspect includes: acquiring first image data; generating second image data by subjecting the first image data to a predetermined type of image processing; and performing recognition processing on the second image data. In this image generation method, the image processing and the recognition processing are performed in synchronization with each other without depending on an instruction from a processor. An image generation program according to another aspect is designed to make a computer system execute the image generation method described above.

The agent that implements the image generation system 2, the image display system 1 or the image generation method according to the present disclosure includes a computer system. The computer system includes, as principal hardware components, a processor and a memory. The functions of the agent that implements the image generation system 2, the image display system 1 or the image generation method according to the present disclosure are performed by making the processor execute the program stored in the memory of the computer system. The program (image generation program) may be stored in advance in the memory of the computer system. Alternatively, the program may also be downloaded through a telecommunications line or be distributed after having been stored in some computer-readable non-transitory storage medium. Examples of the computer-readable non-transitory storage media include a memory card, an optical disc, and a hard disk drive. The processor of the computer system is made up of a single or a plurality of electronic circuits including a semiconductor integrated circuit (IC) or a largescale integrated circuit (LSI). Those electronic circuits may be integrated together on a single chip or distributed on multiple chips without limitation. Those multiple chips may be integrated together in a single device or distributed in multiple devices without limitation.

Also, in the embodiment described above, the image generation system 2 is implemented as a single device with a single housing 70. However, this is only an example and should not be construed as limiting. Alternatively, some function of the image generation system 2 may also be implemented in at least one more housing, other than the housing 70. For example, the function of the first processing unit 50 and the second processing unit 60 of the image generation system 2 may be distributed in two or more housings. Furthermore, at least some functions of the image generation system 2 may be implemented as a cloud computing system as well.

Furthermore, in the embodiment described above, the three cameras 4 are arranged to shoot video presenting a rear view of the body 101. However, this is only an example and should not be construed as limiting. Alternatively, a plurality of cameras 4 may also be arranged to shoot video presenting a front or side view of the body 101. In that case, the image generation system 2 may generate a synthetic image presenting a front or side view of the body 101 by stitching together the image frames captured by the plurality of cameras 4.

Optionally, the plurality of cameras 4 may also be arranged so as to capture an omnidirectional image presenting a 360 degree view around the body 101. In that case, the image generation system 2 may generate an omnidirectional image presenting a 360 degree view around the body 101 by stitching together the image frames captured by the plurality of cameras 4.

In the embodiment described above, the image generation system 2 performs stitching processing to synthesize a plurality of image frames together. However, this is only an example and should not be construed as limiting. Alternatively, the image generation system 2 may perform any type of processing other than stitching. For example, the image generation system 2 may generate second image data by performing a predetermined type of image processing on the first image data, and perform the processing of detecting any desired object in the second image data by performing recognition processing on the second image data.

In the exemplary embodiment described above, the image display system 1 including the image generation system 2 is applied to the automobile 100. However, this is only an example and should not be construed as limiting. The image display system 1 is also applicable to motorcycles, bicycles, railway trains, aircrafts, construction machines, ships, boats, and various types of moving vehicles other than automobiles 100.

Furthermore, the image display system 1 including the image generation system 2 according to the embodiment described above does not have to be applied to the automobile 100, but may also be applied to various types of facilities including single-family dwelling houses, multi-family dwelling houses, office buildings, and commercial facilities, to name just a few.

Furthermore, in the foregoing description of embodiments, if one of two values being compared with each other is "less than" the other, the phrase "less than" may also be a synonym of the phrase "equal to or less than" that covers both a situation where these two values are equal to each other and a situation where one of the two values is less than the other. That is to say, it is arbitrarily changeable, depending on selection of a reference value or any preset value, whether or not the phrase "less than" covers the situation where the two values are equal to each other. Therefore, from a technical point of view, there is no difference between the phrase "less than" and the phrase "equal to or less than." Similarly, the phrase "greater than" may be a synonym of the phrase "equal to or greater than" as well in the embodiment described above.

(Resume)

As can be seen from the foregoing description, an image generation system (2) according to a first aspect includes an acquisition unit (40), a first processing unit (50), and a second processing unit (60). The acquisition unit (40) acquires first image data. The first processing unit (50) generates second image data by subjecting the first image data, acquired by the acquisition unit (40), to a predetermined type of image processing. The second processing unit (60) performs recognition processing on the second image data. The first processing unit (50) and the second processing unit (60) perform their respective processing in synchronization with each other without depending on an instruction from a processor (10).

This aspect eliminates the need for the processor (10) to wait for the first processing unit (50) to notify the processor (10) of completion of processing, thus curbing the decline in the processing speed of the processor (10), compared to a situation where the processor (10) does not instruct the second processing unit (60) to start processing until the processing (10) is notified of the completion of processing by the first processing unit (50).

In an image generation system (2) according to a second aspect, which may be implemented in conjunction with the first aspect, the first image data represents a first group of image frames, and the second image data represents a second group of image frames.

This aspect curbs the decline in the processing speed of the processor (10).

In an image generation system (2) according to a third aspect, which may be implemented in conjunction with the second aspect, the recognition processing includes search processing and matching processing. The search processing includes searching the second image data for a feature quantity. The matching processing includes matching two image frames of interest, selected from the second group of image frames, one against the other with respect to the feature quantity found through the search processing.

This aspect also curbs the decline in the processing speed of the processor (10), even when the second processing unit (60) performs matching processing of matching two image frames of interest one against the other with respect to the feature quantity found by searching the second image data.

In an image generation system (2) according to a fourth aspect, which may be implemented in conjunction with the third aspect, the acquisition unit (40) acquires the first group of image frames. The first processing unit (50) generates the second group of image frames by subjecting the first group of image frames, acquired by the acquisition unit (40), to the predetermined type of the image processing. The search processing includes searching the two image frames of interest for the feature quantity. The matching processing includes detecting a feature point, commonly present in both of the two image frames of interest, by matching the two image frames of interest one against the other with respect to the feature quantity found through the search processing.

This aspect also curbs the decline in the processing speed of the processor (10), even when the matching processing is performed on two image frames of interest selected from the second group of image frames generated by subjecting the first group of image frames to the predetermined type of the image processing.

An image generation system (2) according to a fifth aspect, which may be implemented in conjunction with the fourth aspect, further includes a synthesis processing unit (52) for generating, with respect to the feature point detected through the matching processing, synthetic image data by synthesizing the two image frames of interest together.

This aspect also curbs the decline in the processing speed of the processor (10), even when synthetic image data is generated by synthesizing together the two image frames of interest.

In an image generation system (2) according to a sixth aspect, which may be implemented in conjunction with the fourth aspect, the two image frames of interest partially overlap with each other.

In an image generation system (2) according to a seventh aspect, which may be implemented in conjunction with the fourth aspect, the acquisition unit (40) acquires the first group of image frames from a plurality of cameras (4).

In an image generation system (2) according to an eighth aspect, which may be implemented in conjunction with the seventh aspect, the plurality of cameras (4) are provided for a moving vehicle (100) to capture the image frames representing outside of the moving vehicle.

In an image generation system (2) according to a ninth aspect, which may be implemented in conjunction with any one of the first to eighth aspects, the first processing unit (50) performs the predetermined type of the image processing in accordance with a predetermined type of setting information, and the second processing unit (60) performs the recognition processing in accordance with the predetermined type of the setting information.

This aspect also curbs the decline in the processing speed of the processor (10) because the processing load on the processor (10) is lightened by making the first processing unit (50) and the second processing unit (60) perform their respective processing in accordance with the setting information.

An image generation system (2) according to a tenth aspect, which may be implemented in conjunction with the ninth aspect, further includes a decoding unit (30) configured to output, on receiving the predetermined type of the setting information, the predetermined type of the setting information to the first processing unit (50) and the second processing unit (60).

This aspect allows the decoding unit (30) to output the setting information to the first processing unit (50) and the second processing unit (60) by providing the decoding unit (30) with the setting information, thus curbing the decline in the processing speed of the processor (10).

In an image generation system (2) according to an eleventh aspect, which may be implemented in conjunction with the tenth aspect, the decoding unit (30) updates, when a predetermined update condition is satisfied, the predetermined type of the setting information and outputs the predetermined type of the setting information updated to the first processing unit (50) and the second processing unit (60).

This aspect allows, when the update condition is satisfied, the setting information about the specifics of the processing to be performed by the first processing unit (50) and the second processing unit (60) to be updated.

An image generation system (2) according to a twelfth aspect, which may be implemented in conjunction with the eleventh aspect, further includes a setting information generation unit (11) configured to generate the predetermined type of the setting information.

This aspect also curbs the decline in the processing speed of the processor (10).

An image display system (1) according to a thirteenth aspect includes the image generation system (2) according to any one of the first to twelfth aspects, and a display unit (3) configured to display the image generated by the image generation system (2).

This aspect provides an image display system (1) with the ability to curb the decline in the processing speed of the processor (10).

In an image display system (1) according to a fourteenth aspect, which may be implemented in conjunction with the thirteenth aspect, the acquisition unit (40) acquires the first group of image frames from a plurality of cameras (4).

In an image display system (1) according to a fifteenth aspect, which may be implemented in conjunction with the thirteenth or fourteenth aspect, the acquisition unit (40) acquires the first group of image frames from a plurality of cameras (4) provided for a moving vehicle (100). The first processing unit (50) generates the second group of image frames by subjecting the first group of image frames, acquired by the acquisition unit (40), to the predetermined type of the image processing. The display unit (3) displays a synthetic image generated by synthesizing together at least two image frames selected from the second group of image frames.

In an image display system (1) according to a sixteenth aspect, which may be implemented in conjunction with the fifteenth aspect, the plurality of the cameras (4) capture the image frames representing outside of the moving vehicle (100).

An image generation method according to a seventeenth aspect includes: acquiring first image data; generating second image data by subjecting the first image data to a predetermined type of image processing; and performing recognition processing on the second image data. In this image generation method, the image processing and the recognition processing are performed in synchronization with each other without depending on an instruction from a processor.

This aspect provides an image generation method with the ability to curb the decline in the processing speed of the processor (10).

An image generation program according to an eighteenth aspect is designed to make a computer system perform the image generation method according to the seventeenth aspect.

This aspect provides an image generation program with the ability to curb the decline in the processing speed of the processor (10).

A moving vehicle (100) according to a nineteenth aspect includes the image display system (1) according to any one of the thirteenth to sixteenth aspects, and a moving vehicle body (101) configured to mount the image display system (1) thereon.

This aspect provides a moving vehicle (100) with the ability to curb the decline in the processing speed of the processor (10).

Note that these aspects are only exemplary aspects of the present disclosure. That is to say, the present disclosure has many other aspects that have not been mentioned above. For example, various features of the image generation system (2) according to the embodiments described above and variations thereof may also be implemented as an image generation method, an image generation program (computer program), and a non-transitory storage medium that stores the image generation program thereon.

Note that the constituent elements according to the second to twelfth aspects are not essential elements of the image generation system (2) but may be omitted as appropriate and that the constituent elements according to the fourteenth to sixteenth aspects are not essential elements of the image display system (1) but may be omitted as appropriate While various embodiments have been described herein above, it is to be appreciated that various changes in form and detail may be made without departing from the spirit and scope of the present disclosure presently or hereafter claimed.

In this application, the entire contents of Japanese Patent Application No. 2018-53549 mentioned above are hereby incorporated by reference for all purposes.

The invention claimed is:

1. An image generation system comprising:
a memory that stores instructions, and
a processor, when executing the instructions stored in the memory, that performs operations including:
receiving a plurality of first image frames;
performing generation of a plurality of second image frames by subjecting the received plurality of first image frames to a predetermined type of image processing;
performing recognition processing on the plurality of second image frames; and
performing generation of synthetic image data by synthesizing at least two image frames of the plurality of second image frames based on a result of the recognition processing,
wherein the generation of the plurality of second image frames and the recognition processing are performed in synchronization with each other without depending on an instruction from the processor, and the generation of synthetic image data and the recognition processing are performed in synchronization with each other without depending on the instruction.

2. The image generation system of claim 1, wherein
the recognition processing includes search processing and matching processing,
the search processing including searching the plurality of second image frames for a feature quantity,
the matching processing including matching two image frames of interest, selected from the plurality of second image frames, one against the other with respect to the feature quantity found through the search processing.

3. The image generation system of claim 2, wherein
the search processing includes searching the two image frames of interest for the feature quantity, and
the matching processing includes detecting a feature point, commonly present in both of the two image frames of interest, by matching the two image frames of interest one against the other with respect to the feature quantity found through the search processing.

4. The image generation system of claim 3, wherein the generation of synthetic image data includes generating, with respect to the feature point detected through the matching processing, synthetic image data by synthesizing the two image frames of interest together.

5. The image generation system of claim 3, wherein the two image frames of interest partially overlap with each other.

6. The image generation system of claim 1, wherein the plurality of first image frames are received from a plurality of cameras.

7. The image generation system of claim 6, wherein
the plurality of cameras are provided for a moving vehicle to capture the plurality of first image frames representing outside of the moving vehicle.

8. The image generation system of claim 1, wherein
the plurality of second image frames are generated by performing the predetermined type of the image processing in accordance with a predetermined type of setting information, and the recognition processing is performed in accordance with the predetermined type of the setting information.

9. The image generation system of claim 2, wherein
the plurality of second image frames are generated by performing the predetermined type of the image processing in accordance with a predetermined type of setting information, and the recognition processing is performed in accordance with the predetermined type of the setting information.

10. The image generation system of claim 3, wherein
the plurality of second image frames are generated by performing the predetermined type of the image processing in accordance with a predetermined type of setting information, and the recognition processing is performed in accordance with the predetermined type of the setting information.

11. The image generation system of claim 8, wherein the processor further performs operations including: outputting, on receiving the predetermined type of the setting information, the predetermined type of the setting information to be used in the generation of the plurality of second image frames and in the recognition processing.

12. The image generation system of claim 11, wherein
the processor further performs operations including: when a predetermined update condition is satisfied, updating the predetermined type of the setting information and outputting the updated predetermined type of the setting information to be used in the generation of the plurality of second image frames and in the recognition processing.

13. The image generation system of claim 12, wherein the processor further performs operations including generating the predetermined type of the setting information.

14. An image display system comprising:
the image generation system of claim 1; and
a display configured to display an image generated by the image generation system.

15. The image display system of claim 14, wherein
the plurality of first image frames are received from a plurality of cameras.

16. The image display system of claim 14, wherein
the plurality of first image frames are received from a plurality of cameras provided for a moving vehicle,
the plurality of second image frames are generated by subjecting the received plurality of first image frames, to the predetermined type of the image processing, and
the display is configured to display the synthetic image data generated by synthesizing together the at least two image frames selected from the plurality of second image frames.

17. The image display system of claim 16, wherein
the plurality of the cameras are configured to capture the plurality of first image frames representing outside of the moving vehicle.

18. An image generation method comprising:
acquiring a plurality of first image frames;
performing generation of a plurality of second image frames by subjecting the plurality of first image frames to a predetermined type of image processing; and
performing recognition processing on the plurality of second image frames; and
performing generation of synthetic image data by synthesizing at least two image frames of the plurality of second image frames based on a result of the recognition processing,
wherein the generation of the plurality of second image frames and the recognition processing are performed in synchronization with each other without depending on an instruction from a processor, and the generation of synthetic image data and the recognition processing are performed in synchronization with each other without depending on the instruction.

19. A moving vehicle comprising:
the image display system of claim 14, and
a moving vehicle body configured to mount the image display system thereon.

* * * * *